Nov. 27, 1962
R. W. HERR
3,065,909
COUNTER MECHANISMS
Filed June 18, 1959
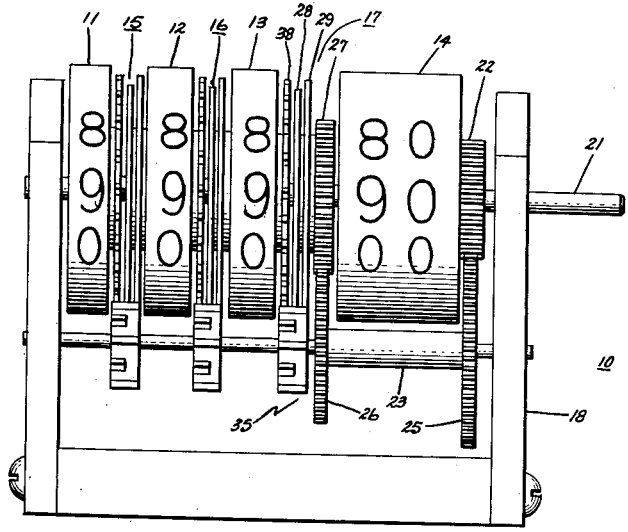
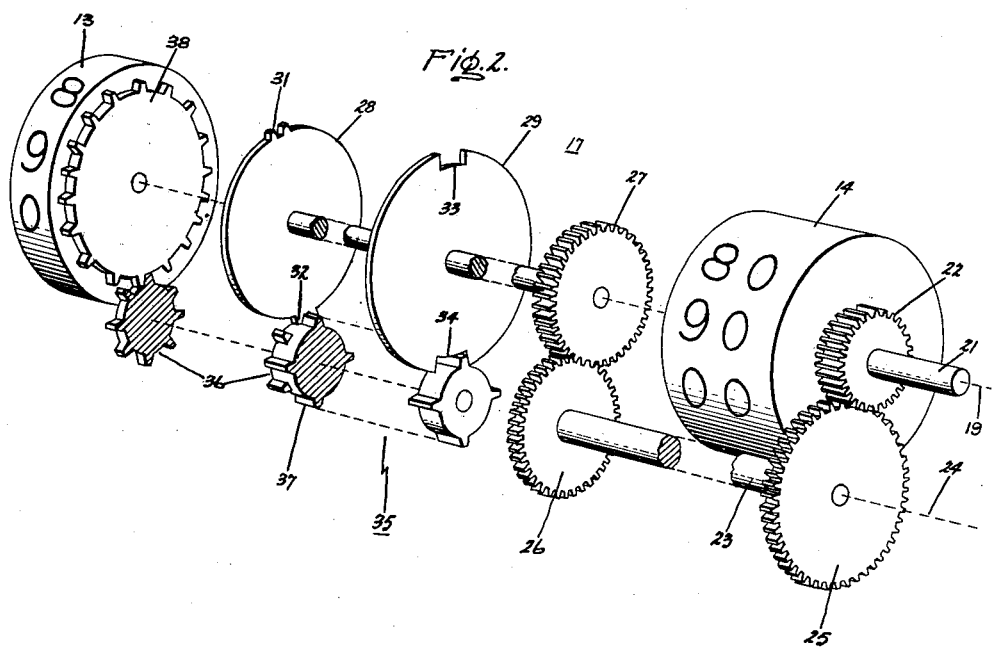
Inventor:
Robert W. Herr,
by Lust & Irish
Attorneys.

3,065,909
COUNTER MECHANISMS
Robert W. Herr, 3126 Garden Park Drive,
Fort Wayne, Ind.
Filed June 18, 1959, Ser. No. 821,183
4 Claims. (Cl. 235—139)

This invention relates generally to revolution counters and more particularly to a revolution counter mechanism adapted for high speed input.

Revolution counters conventionally comprise a plurality of successively higher order number wheels respectively interconnected by intermittent motion transferring mechanisms; in a typical decimal counter, each number wheel is advanced one increment responsive to ten revolutions of the next higher order number wheel. A common form of intermittent motion transferring mechanism employed in revolution counters comprises a two-toothed gear and cooperating locking cam driving a mutilated pinion. There are applications for revolution counters in which the input shaft is required to be driven at a very high speed, e.g., 3,000 r.p.m. or higher. Since the first two-toothed gear and locking cam is conventionally directly driven from the first number wheel, i.e., at the same speed as the input shaft, it will be readily apparent that at such high input shaft speeds, the first transfer mechanism is subjected to considerable shock and pounding. Operation of the first transfer mechanism at such high speeds thus results in rapid wear of the cooperating parts and necessitates that the parts be made heavier than is normally the case. It is therefore desirable to provide a revolution counter adapted for use at high input speeds in which the first transfer mechanism is not required to operate at the same speed as the input shaft, thus reducing the pounding and wear previously encountered and permitting the first transfer mechanism to be constructed with lighter parts.

It is therefore an object of my invention to provide an improved revolution counter mechanism.

Another object of my invention is to provide an improved revolution counter mechanism particularly adapted for high input speeds.

A further object of my invention is to provide an improved revolution counter for use at high input speeds in which the first transfer mechanism is operated at a reduced speed with reference to the speed of the input shaft.

My invention in its broader aspects provides a revolution counter mechanism having a first number wheel with an input shaft directly connected thereto. An intermediate shaft is provided with speed reducing means coupling the input shaft to the intermediate shaft and providing a predetermined integral speed reduction, i.e., 2-to-1, 3-to-1, etc. A second number wheel is provided with intermittent motion transferring means interconnecting the intermediate shaft to the second number wheel and arranged to provide a plurality of motion transfers for each revolution of the intermediate shaft equal to the speed reduction provided by the speed reducing means. In the preferred embodiment of my invention, the intermittent motion transferring means is a transfer mechanism comprising a segmental gear and cooperating locking cam driven by the intermediate shaft and driving a mutilated pinion which in turn drives another gear connected to the second number wheel with the segmental gear having a plurality of equally spaced two-tooth segments thereon equal in number to the speed reduction provided by the speed reducing means.

Further objects and advantages of my invention will become apparent by reference to the following description and the accompanying drawing, and the features of novelty which characterize this invention will be pointed out with particularity in the claims annexed to and forming a part of this specification.

In the drawing:

FIG. 1 is a side elevational view of a decimal counter incorporating my invention; and FIG. 2 is a fragmentary exploded view in perspective, partly broken away, further illustrating my invention.

Referring now to the figures of the drawing, the illustrated embodiment of my invention is a decimal counter, generally indicated at 10, comprising successively higher order number wheels 11, 12, 13 and 14 respectively interconnected by intermittent motion transferring mechanism 15, 16 and 17 and supported in frame 18. It will be seen that the number wheels 11, 12, 13, 14 and intermittent motion transferring mechanisms 15, 16, 17 are disposed in spaced apart relationship along axis 19 of input shaft 21. Input shaft 21 is directly connected to the lowest order number wheel 14 so that the number wheel 14 is driven at the same speed as the input shaft 21, for example, 3,000 r.p.m.

A first gear 22 is provided on the side of number wheel 14 removed from the other number wheels, gear 22 being either formed on number wheel 14 or attached to input shaft 21 so that it is driven at the same speed as the input shaft 21. An intermediate or jack shaft 23 is provided disposed on axis 24 parallel to axis 19 but spaced therefrom on the outside of the number wheels 11, 12, 13, 14, as shown. A second gear 25 is connected to jack shaft 23 and is driven by gear 22 on input shaft 21. In the illustrated embodiment, gear 22 is provided with twenty-eight teeth, and gear 25 is provided with fifty-six teeth, thus providing a two-to-one speed reduction for the intermediate shaft 23, i.e., intermediate shaft 23 is driven at half the rotational speed of the input shaft 21.

Another gear 26 is connected to intermediate shaft 23 being driven thereby, gear 26 in turn driving gear 27 disposed on axis 19 on the side of number wheel 14 remote from gear 22. Gear 26 drives gear 27 with a one-to-one speed relation, and in the illustrated embodiment, each of the gears 26 and 27 is provided with forty-two teeth. Gear 27 in turn is directly connected to drive segmental gear 28 and locking cam 29 of the first transfer mechanism 17, i.e., segmental gear 28 and locking cam 29 are thus driven at the same speed as the intermediate shaft 23, i.e., at half the speed of input shaft 21 in the illustrated embodiment.

Segmental gear 28 is provided with a plurality of equally spaced toothed segments equal in number to the speed reduction provided by gears 22 and 25, and thus in the illustrated embodiment, segmental gear 28 is provided with two equally spaced two-tooth segments 31 and 32 in alignment respectively with notches 33 and 34 of locking cam 29. The double two-tooth segmental gear 28 and its cooperating locking cam 29 drive mutilated pinion 35; the two-tooth segments 31 and 32 of segmental gear 28 cooperate with fully-toothed portion 36 while the locking cam 29 cooperates with mutilated portion 37 of mutilated pinion 35. In the illustrated embodiment, fully toothed portion 36 of mutilated pinion 35 is provided with eight teeth while the mutilated portion 37 is provided with four teeth, i.e., every other tooth of the basic eight tooth pinion 36 having been removed, as shown. It will be seen that mutilated pinion 35 is disposed on the axis 24 of intermediate shaft 23. Fully toothed portion 36 of mutilated pinion 35 in turn drives gear 38 connected to the number wheel 13; in the illustrated embodiment, gear 38 is provided with twenty teeth. The remaining transfer mechanisms 15 and 16 respectively connecting number wheels 11 and 12, and 12 and 13 are conventionally provided with single two-tooth gear and locking cam combinations as is well known in the art.

It will now be readily seen that the two-to-one speed reduction effected by gears 22 and 25 is compensated for by the double two-tooth gear and locking cam combination 28, 29 which provides two motion transfers responsive to each revolution of the intermediate shaft 23. It is thus seen that the transfer mechanism 17 provides one motion transfer for each revolution of the input shaft 21, however, that the gear and locking cam combination 28, 29 is only rotating at half the speed of input shaft 21, thus drastically reducing the pounding and wear which would be provided if the transfer mechanism were operated at the same speed as the input shaft 21. It will be readily seen that instead of the two-to-one speed reduction provided between input shaft 21 intermediate shaft 23, other larger integral speed reductions can be provided, i.e., three-to-one, four-to-one, etc., and that with such higher order speed reductions, it is merely necessary that the transfer mechanism 17 provide a correspondingly higher number of motion transfers for each revolution of the intermediate shaft 23, i.e., three transfers per revolution, four transfers per revolution, etc.

It will now be seen that I have provided a revolution counter mechanism in which the input shaft can be operated at very high speed, but in which the first transfer mechanism is operated at no more than one-half the speed of the input shaft, thus drastically reducing the pounding and wear on the first transfer mechanism which in turn permits the first transfer mechanism to be constructed with lighter parts, thus providing a smaller and lighter device.

While I have illustrated and described a specific embodiment of my invention, further modifications and improvements will occur to those skilled in the art and I desire therefore in the appended claims to cover all modifications which do not depart from the spirit and scope of this invention.

What is claimed is:

1. In a revolution counter mechanism: a first number wheel; means for continuously rotating said first number wheel; an intermediate shaft; continuous speed reducing means coupling said first number wheel to said intermediate shaft and providing a predetermined integral speed reduction ratio; a second number wheel; and intermittent motion transferring means interconnecting said intermediate shaft and said second number wheel and arranged to provide a plurality of motion transfers for each revolution of said intermediate shaft, the number of said transfers for each revolution of said intermediate shaft being equal to said speed reduction ratio.

2. In a revolution counter mechanism: a first number wheel having an input shaft directly connected thereto for continuously rotating the same; an intermediate shaft; a first gear connected to said input shaft and driven at the same speed thereby; a second gear connected to said intermediate shaft and driven by said first gear; said first and second gears having a tooth ratio to provide a predetermined integral speed reduction ratio for said intermediate shaft; a second number wheel; and intermittent motion transferring means interconnecting said intermediate shaft and said second number wheel and comprising a segmental gear and cooperating locking cam driven by said intermediate shaft and driving a mutilated pinion, and a third gear connected to said second number wheel and driven by said mutilated pinion, said segmental gear having a plurality of equally spaced toothed segments equal to said speed reduction ratio thereby providing a number of motion transfers for each revolution of said intermediate shaft equal to said speed reduction ratio to compensate therefor.

3. In a revolution counter mechanism: first and second number wheels disposed along a first axis; an input shaft directly connected to drive said first number wheel for continuously rotating the same; a first gear connected to said input shaft and driven at the same speed thereby; an intermediate shaft disposed on an axis parallel with and spaced from said first axis; a second gear connected to said intermediate shaft and driven by said first gear; said first and second gears having a tooth ratio to provide a predetermined integral speed reduction ratio for said intermediate shaft; a third gear connected to said intermediate shaft; and intermittent motion transferring means interconnecting said intermediate shaft and said second number wheel and comprising a segmental gear and cooperating locking cam disposed on said first axis and driving a mutilated pinion, a fourth gear connected to said segmental gear and locking cam and driven by said third gear in one-to-one speed relation thereby driving said segmental gear and locking cam at the same speed as said intermediate shaft, and a fifth gear connected to said second number wheel and driven by said mutilated pinion, said segmental gear having a plurality of equally spaced two-tooth segments equal in number to said speed reduction ratio thereby providing a number of motion transfers for each revolution of said intermediate shaft equal to said speed reduction ratio to compensate therefor.

4. In a revolution counter mechanism: first and second number wheels spaced apart along a first axis and respectively having a single series of numbers thereon from 0 to 9; an input shaft directly connected to said first number wheel on the one side thereof remote from said second number wheel for continuously rotating the same; a first gear connected to said input shaft and driven at the same speed thereby and disposed on said one side of said first number wheel; an intermediate shaft disposed on a second axis parallel with said first axis and outside of said number wheels; a second gear connected to said intermediate shaft on said one side of said first number wheel and driven by said first gear; said first and second gears having a tooth ratio to provide a predetermined integral speed reduction ratio for said intermediate shaft; a third gear connected to said intermediate shaft on the other side of said first number wheel; and intermittent motion transferring means interconnecting said intermediate shaft and said second number wheel and comprising a segmental gear and cooperating locking cam disposed on said first axis between said first and second number wheels and driving a mutilated pinion disposed on said second axis, a fourth gear connected to said segmental gear and locking cam and driven by said third gear in one-to-one speed relation, and a fifth gear connected to said second number wheel on the side thereof toward said first number wheel and driven by said mutilated pinion, said segmental gear having a plurality of equally spaced two-tooth segments equal in number to said speed reduction ratio thereby providing a number of motion transfers for each revolution of said intermediate shaft equal to said speed reduction ratio to compensate therefor.

References Cited in the file of this patent

UNITED STATES PATENTS

| | | |
|---|---|---|
| 782,605 | Goldberg | Feb. 14, 1905 |
| 1,826,520 | McGowan | Oct. 6, 1931 |
| 2,682,373 | Opocensky et al. | June 29, 1954 |

OTHER REFERENCES

Elements of Mechanisms; by Doughtie and James; Wiley 1955, page 450.